United States Patent
Brehl et al.

(10) Patent No.: US 12,259,698 B2
(45) Date of Patent: Mar. 25, 2025

(54) METHOD, STRUCTURE, APPARATUS, COMPUTER PROGRAM AND COMPUTER-READABLE STORAGE MEDIUM FOR ANALYZING A MECHATRONIC SYSTEM

(71) Applicant: Bayerische Motoren Werke Aktiengesellschaft, Munich (DE)

(72) Inventors: Dominik Brehl, Munich (DE); Marc Brummer, Poing (DE); Maximilian Thiele, Poecking (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 464 days.

(21) Appl. No.: 17/630,835

(22) PCT Filed: Jun. 24, 2020

(86) PCT No.: PCT/EP2020/067574
§ 371 (c)(1),
(2) Date: Jan. 27, 2022

(87) PCT Pub. No.: WO2021/058149
PCT Pub. Date: Apr. 1, 2021

(65) Prior Publication Data
US 2022/0269231 A1    Aug. 25, 2022

(30) Foreign Application Priority Data
Sep. 23, 2019    (DE) ............ 10 2019 125 463.9

(51) Int. Cl.
*G05B 17/02*     (2006.01)
*G06Q 10/20*    (2023.01)
(52) U.S. Cl.
CPC ............ *G05B 17/02* (2013.01); *G06Q 10/20* (2013.01)

(58) Field of Classification Search
CPC ............ G05B 17/02; G05B 2219/2637; G05B 2219/31342; G06Q 10/20; G06Q 10/06; G06F 30/20; G06F 2119/02
See application file for complete search history.

(56) References Cited

U.S. PATENT DOCUMENTS

| | | | |
|---|---|---|---|
| 2008/0208609 A1* | 8/2008 | Preece | G06Q 10/06 705/1.1 |
| 2018/0315260 A1* | 11/2018 | Anthony | G06N 5/022 |

FOREIGN PATENT DOCUMENTS

| | | |
|---|---|---|
| DE | 10015114 A1 | 10/2001 |
| DE | 10056413 A1 | 5/2002 |
| EP | 1533674 A2 | 5/2005 |

OTHER PUBLICATIONS

Scarselli, Franco, et al. "The graph neural network model." IEEE transactions on neural networks 20.1 (2008): 61-80. (Year: 2008).*

(Continued)

*Primary Examiner* — Alan D Hutchinson
(74) *Attorney, Agent, or Firm* — Maginot, Moore & Beck LLP

(57) ABSTRACT

In a method for analyzing a mechatronic system which has one or more mechatronic components, structure data is provided. The structure data is representative of a predefined structure for a network. The structure has a plurality of layers and a respective layer is representative in each case of a technical domain of the mechatronic system. A model in the form of a multilayer network is generated depending on a multiplicity of input data relating to the mechatronic system and to the predefined structure. The multilayer network comprises a multiplicity of nodes and a plurality of connections in each case between two nodes. Each node of the plurality of nodes is assigned to one of the plurality of layers. The mechatronic system is analyzed depending on the multilayer network.

20 Claims, 5 Drawing Sheets

(56) References Cited

OTHER PUBLICATIONS

International Search Report corresponding to International Patent Application No. PCT/EP2020/067574, dated Aug. 27, 2020 (4 pages).

German Search Report corresponding to German Patent Application No. 10 2019 109 597.2, dated Nov. 26, 2019 (6 pages).

Huang, Yingping, et al.: Probability based vehicle fault diagnosis: Bayesian network method. In: Journal of Intelligent Manufacturing, 19, 2008, 3, 301-311. https://link.springer.com/content/pdf/10.1007/s10845-008-0083-7.pdf [abgerufenam Sep. 18, 2020].

Jeong Y, Son S, Lee B.: The Lightweight Autonomous Vehicle Self-Diagnosis (LAVS) Using Machine Learning Based on Sensors and Multi-Protocol IoT Gateway. In: Sensors, 19, Jun. 3, 2019, 11, 1-24 (2534). https://www.mdpi.com/1424-8220/19/11/2534 [abgerufenam Sep. 18, 2020].

Utschenreiter-Praszkiewicz, Izabela: Graph-Based Decision Making in Industry. In: Graph Theory-Advanced Algorithms and Applications, IntechOpen, 2017, 45-62. https://www.intechopen.com/books/graph-theory-advanced-algorithms-and-applications/graph-based-decision-making-in-industry [abgerufen am Sep. 18, 2020].

* cited by examiner

METHOD, STRUCTURE, APPARATUS, COMPUTER PROGRAM AND COMPUTER-READABLE STORAGE MEDIUM FOR ANALYZING A MECHATRONIC SYSTEM

The present application is the U.S. national phase of PCT Application PCT/EP2020/067574 filed on Jun. 24, 2020, which claims priority of German patent application No. 102019125463.9 filed on Sep. 23, 2019, which is incorporated herein by reference in its entirety.

TECHNICAL FIELD

The invention relates to a method, an apparatus, and a structure for a network for analyzing a mechatronic system. The invention further relates to a computer program and a computer-readable storage medium for analyzing a mechatronic system.

BACKGROUND

Due to the ever-increasing complexity of mechatronic systems, bespoke maintenance and repair of said systems is becoming increasingly difficult.

The underlying object of at least some embodiments described herein is to contribute to the simple and efficient analysis of mechatronic systems.

SUMMARY

The object is achieved by the features of the independent patent claims. Advantageous designs are characterized in the subclaims.

A first aspect is characterized by a method for analyzing a mechatronic system which has one or more mechatronic components.

According to the first aspect, structure data is provided. The structure data is representative of a predefined structure for a network. The structure has a plurality of layers and a respective layer is representative in each case of a technical domain of the mechatronic system. A model in the form of a multilayer network is generated depending on a multiplicity of input data relating to the mechatronic system and to the predefined structure. The multilayer network comprises a multiplicity of nodes and a multiplicity of connections in each case between two nodes. Each node of the multiplicity of nodes is assigned to one of the plurality of layers. The mechatronic system is analyzed depending on the multilayer network.

As a result, it is possible to represent associations of functions of the mechatronic system, their malfunctions and effects on the mechatronic system in a simplified and efficiently determinable manner, in the form of the multilayer network. It is further possible as a result to identify and analyze associations of a wide variety of technical domains of the mechatronic system. This enables, for example, a considerable saving in terms of time and costs for each individual diagnosis or repair. The analysis of the mechatronic system is further advantageous in a development phase of the mechatronic system, as in the development of robust diagnostic measures and/or a diagnostic design or the like.

The mechatronic system is, in particular, a complex mechatronic system, such as e.g. a vehicle. The vehicle is preferably a single-track or multi-track vehicle (e.g. passenger vehicle, truck, transporter, motorcycle). This offers a plurality of advantages explicitly described in this document and a plurality of further advantages understandable to the person skilled in the art. One particularly significant advantage can be found, in particular, in the application to a highly or fully autonomously driven vehicle. Alternatively, the vehicle can be an aircraft or a watercraft, wherein the method is applied accordingly to aircraft or watercraft.

The predefined structure has, in particular, at least two layers.

The multi-channel network is designed to interconnect domain-based development knowledge in an information network, so that effect chains and tolerance chains can be used, for example, to find causes of a fault.

The multiplicity of input data relating to the mechatronic system can be provided by (giant, computable) matrices which contain the multiplicity of input data in networked and coded form. The matrix representation enables an efficient automated processing of the multiplicity of input data for the analysis of the mechatronic system. The generation of the model in the form of the multilayer network enables a manual and/or automated (further and/or intermediate) processing of the multiplicity of input data in order to achieve a desired quality and further optimize the analysis.

The input data can be based on a wide variety of data from the development process or from the operation of the mechatronic system.

The input data comprise: fault data which are configured to define one or more fault states, and/or measured value data which are configured to define one or more measured values, and/or observation data which are configured to define one or more symptoms, and/or interface data which are configured to define one or more interfaces, preferably wherein the one or more interfaces are configured to connect data from the technical domains of the mechatronic system, and/or repair data which are configured to define one or more repair measures, and/or design data which are configured to define one or more design features, preferably wherein the one or more design features are configured to map one or more structural features, and/or maintenance data which are configured to define one or more maintenance measures, preferably wherein the one or more maintenance measures are configured to associate one or more fault states with one or more repair measures, and/or software data which are configured to define one or more software states, preferably wherein the one or more software states are configured to associate one or more fault states with one or more measured values, and/or data from a signal analysis and/or function analysis of the mechatronic system.

Each connection of the multiplicity of connections is representative of the relation of one node with another.

A symptom, for example, is connected to a fault pattern if the symptom correlates in any way with the fault pattern. A lacking correlation (e.g. "vehicle color" with "heat generation") can be mapped by a correspondingly lacking connection or corresponding weighting of the respective connection.

The data from the development process contain, for example: diagnostic trouble code (DTC)/"health indicator" lists (e.g. fault data) contain listings of possible occurring fault memories and possible measured values.

Control unit description files contain a description indicating which diagnostic information is stored, with which coding, and where it is stored on a control unit. DTCs relate to fault memory descriptions, particularly in connection with environmental conditions, and indicate the presence of a fault (or not); HIs can additionally indicate a fault severity. Service instructions (e.g. maintenance data) contain service procedures in the event of problems which need to be dealt with promptly outside a test plan. Test plans (e.g. contained in maintenance files) are to be understand as essentially similar to service instructions, but are already stored in the diagnostic tester. Wiring plans (e.g. design data) contain electrical connections and pin assignments (e.g. pin configurations, pinouts) which can be represented in the same way as circuit faults in the multilayer network. Mechanical design data contain mechanical connections between individual parts and their tolerances. Errors in the balancing equations in the multilayer network can be represented on this basis. Failure mode and effects analysis (FMEA)/fault trees (e.g. fault data) contain effects particularly of mechanical faults on observable symptoms and can be represented directly as connections in the multilayer network. The FMEA is frequently of a mechanical nature, whereas the fault trees (FTA) are frequently based on E/E faults. Software documentation (e.g. software data) relates to effects of faulty signals on observable symptoms and be applied in a manner similar to FMEA.

The multilayer network is stored for further processing, preferably in a graph structure, for example in a Neo4J format.

The analysis of the mechatronic system makes it possible to establish, for example, which mechatronic components have a relation with which DTC (diagnostic result), and/or which fault patterns are not diagnosed, and/or how often a DTC comes into play if the mechatronic system has a predefined system characteristic, or the like.

The analysis of the mechatronic system enables, for example, the generation of subnetworks of the multilayer network.

According to one optional design, each connection of the multiplicity of connections comprises one or more of the following connection parameters: a first value which is designed to define whether the respective connection is a directional connection. If the respective connection is a directional connection, the connection parameters comprise a second value. The second value is designed to define a direction of the respective connection. The direction can assume one of two unidirectional values and one bidirectional value. A third value is designed to define whether the respective connection is a weighted connection. If the respective connection is a weighted connection, the connection parameters comprise a fourth value. The fourth value is designed to define a weighting of the respective connection.

As a result, it is possible to map the relation in each case between two nodes simply, efficiently and precisely. It is further possible as a result to associate the technical domains of the mechatronic system.

The weighting assumes a value, for example, between 0% and 100%. Additionally or alternatively, the one or more connection parameters comprise text information which is designed to define the respective connection.

According to a further optional design, the multilayer network has a component layer. A respective node assigned to the component layer comprises one or more component attributes and is representative of a respective mechatronic component and its mechatronic mode of operation. The component layer is representative of associations between the respective mechatronic components.

The component layer is representative of a first technical domain of the mechatronic system, wherein the first technical domain comprises the one or more mechatronic components and their respective mechatronic mode of operation, and also associations between the respective mechatronic components.

As a result, it is possible to analyze the first technical domain simply and efficiently and associate it with the other technical domains of the mechatronic system.

The one or more component attributes comprise: an identification attribute which uniquely identifies the respective node, for example through assignment to a unique sequence of numbers and/or letters, and/or a type attribute which characterizes the respective node as a mechatronic component, and/or a name attribute in text form which is representative of the respective node, and/or a failure rate and/or a failure probability and/or a cost value for the respective mechatronic component, or the like.

According to a further optional design, the multilayer network has a function layer. A respective node assigned to the function layer comprises one or more function attributes and is representative of a respective function of the mechatronic system. The function layer is representative of functional processes between the respective functions. If the multilayer network has the component layer, a respective connection in each case between a node assigned to the function layer and a node assigned to the component layer is representative of the performance of a respective function represented by the corresponding node of the function layer by a respective mechatronic component represented by the corresponding node of the component layer.

The function layer is representative of a second technical domain of the mechatronic system, wherein the second technical domain comprises the respective functions and a representation of functional processes between the respective functions of the mechatronic system.

As a result, it is possible to analyze the second technical domain simply and efficiently and associate it with the other technical domains of the mechatronic system.

The respective function comprises a hardware and/or software function of the mechatronic system and/or a hardware and/or software function of a respective mechatronic component.

The functional processes between the respective functions comprise Boolean algebra operations, in particular operations by means of "AND" and/or "OR" operators or the like.

The one or more function attributes comprise: the identification attribute and/or the type attribute which characterizes the respective node as a function of the mechatronic system, and/or the name attribute, and/or the failure rate and/or the failure probability and/or a weighting attribute which is representative of a weighting of the respective function related to other functions of the mechatronic system, and/or a system level attribute which is representative of the system level of the mechatronic system with which the respective function is associated, or the like. The system levels of the mechatronic system can be its "drive" and/or "torque setter" and/or "torque converter", or the like.

According to a further optional design, the multilayer network has a fault layer. A respective node assigned to the fault layer comprises one or more fault attributes and is representative of a respective fault state of a respective function in relation to a respective mechatronic component. The fault layer is representative of associations between the respective fault states. If the multilayer network has the function layer, a respective connection in each case between a node assigned to the fault layer and a node assigned to the function layer is representative of the assignment of a respective fault state represented by the corresponding node of the fault layer to a respective function represented by the corresponding node of the function layer.

The fault layer is representative of a third technical domain of the mechatronic system, wherein the third technical domain comprises the respective fault states and a representation of associations between the respective fault states of the functions in relation to the one or more mechatronic components.

As a result, it is possible to analyze the third technical domain simply and efficiently and associate it with the other technical domains of the mechatronic system.

The one or more fault attributes comprise: the identification attribute and/or the type attribute which characterizes the respective node as the fault state of the mechatronic system, and/or the name attribute, and/or an occurrence probability which is representative of a value of a probability that the respective fault state will occur, or the like.

According to a further optional design, the multilayer network has a diagnostic layer. A respective node assigned to the diagnostic layer comprises one or more diagnostic attributes and is representative of a respective diagnostic result of the mechatronic system. The diagnostic layer is representative of associations between the respective diagnostic results. If the multilayer network has the fault layer, a respective connection in each case between a node assigned to the diagnostic layer and a node assigned to the fault layer is representative of the relevance of a respective diagnostic result represented by the corresponding node of the diagnostic layer for recognizing the respective fault state represented by the corresponding node of the fault layer.

The diagnostic layer is representative of a fourth technical domain of the mechatronic system, wherein the fourth technical domain comprises the respective diagnostic results and a representation of associations between the respective diagnostic results of the mechatronic system.

As a result, it is possible to analyze the fourth technical domain simply and efficiently and associate it with the other technical domains of the mechatronic system.

The diagnostic results can comprise the fault patterns, such as DTCs, which indicate the presence of a fault, or the absence thereof (e.g. binary, "yes"/"no", "present"/"not present"), or can relate to "health indicators" (HIs) which can map a state of a component (e.g. green/amber/red for "system OK"/"system modified"/"critical fault"). The difference is that DTCs represent binary fault states and HIs represent continuous fault severity metrics which can map a fault severity (and can comprise e.g. one or more measured values).

If a respective diagnostic result comprises a DTC, the one or more diagnostic attributes comprise: the identification attribute and/or a detection level and/or a repair cost attribute which is representative of a level of repair costs which are determined depending on the diagnostic result, or the like.

If a respective diagnostic result comprises an HI, the one or more diagnostic attributes comprise: the identification attribute and/or the type attribute which characterizes the respective node as an HI, and/or the name attribute, and/or the system level attribute which is representative of the system level of the mechatronic system with which the respective diagnostic result is associated, or the like.

According to a further optional design, the multilayer network has a symptom layer. A respective node assigned to the symptom layer comprises one or more symptom attributes and is representative of a respective symptom of the mechatronic system. The symptom layer is representative of associations between the respective symptoms. If the multilayer network has the fault layer, a respective connection in each case between a node assigned to the symptom layer and a node assigned to the fault layer is representative of the relevance of a respective symptom represented by the corresponding node of the symptom layer for recognizing the respective fault state represented by the corresponding node of the fault layer.

The symptom layer is representative of a fifth technical domain of the mechatronic system, wherein the fifth technical domain comprises the respective symptoms and a representation of associations between the respective symptoms of the mechatronic system.

As a result, it is possible to analyze the fifth technical domain simply and efficiently and associate it with the other technical domains of the mechatronic system.

The symptoms are representative of respective features and/or signs relating to the mechatronic system. Symptoms are, for example, that the mechatronic system has a loss of power, and/or an occurrence of an error message and/or a gear cannot be selected and/or an acoustic anomaly, such as a rattle, or the like.

The one or more symptom attributes comprise: the identification attribute and/or the type attribute which characterizes the respective node as a symptom of the mechatronic system, and/or the name attribute or the like.

According to a further optional design, the multilayer network has a system characteristic layer. A respective node assigned to the system characteristic layer comprises one or more system characteristic attributes and is representative of a respective system characteristic of the mechatronic system. The system characteristic layer is representative of associations between the respective system characteristics. If the multilayer network has the fault layer, a respective connection in each case between a node assigned to the system characteristic layer and a node assigned to the fault layer is representative of the relevance of a respective system characteristic represented by the corresponding node of the system characteristic layer for recognizing the respective fault state represented by the corresponding node of the fault layer.

The system characteristic layer is representative of a sixth technical domain of the mechatronic system, wherein the sixth technical domain comprises the respective system characteristics and a representation of associations between the respective system characteristics of the mechatronic system.

As a result, it is possible to analyze the sixth technical domain simply and efficiently and associate it with the other technical domains of the mechatronic system.

System characteristics are, for example, a specific variant and/or a specific model of the mechatronic system, and/or specific mechatronic components which the mechatronic system has, and/or a production time period of the mechatronic system and/or a color of the mechatronic system or the like.

According to a further optional design, the multilayer network has an environment layer. A respective node assigned to the environment layer comprises one or more environment attributes and is representative of a respective characteristic of an environment in which the mechatronic system is operated. The environment layer is representative of associations between the respective characteristics of the environment. If the multilayer network has the fault layer, a respective connection in each case between a node assigned to the environment layer and a node assigned to the fault layer is representative of the relevance of a respective characteristic of the environment represented by the corresponding node of the environment layer for recognizing the respective fault state represented by the corresponding node of the fault layer.

The environment layer is representative of a seventh technical domain of the mechatronic system, wherein the seventh technical domain comprises the respective characteristics of the environment and a representation of associations between the respective characteristics of the environment.

As a result, it is possible to analyze the seventh technical domain simply and efficiently and associate it with the other technical domains of the mechatronic system.

The one or more environment attributes comprise: the identification attribute and/or the type attribute which characterizes the respective node as the respective characteristic of the environment, and of the name attribute or the like.

The environment is representative of a geographical region in which the mechatronic system is operated.

Characteristics of the environment are, for example, a characteristic value for the geographical region, a temperature range and/or a temperature of the environment, or the like.

According to a further optional design, the multilayer network has a system usage layer. A respective node assigned to the system usage layer comprises one or more system usage attributes and is representative of a respective mode of operation of the mechatronic system.

The system usage layer is representative of associations between the respective modes of operation of the mechatronic system. If the multilayer network has the fault layer, a respective connection in each case between a node assigned to the system usage layer and a node assigned to the fault layer is representative of the relevance of a respective operating mode represented by the corresponding node of the system usage layer for recognizing the respective fault state represented by the corresponding node of the fault layer.

The system usage layer is representative of an eighth technical domain of the mechatronic system, wherein the eighth technical domain comprises the respective operating modes of the mechatronic system and a representation of associations between the respective operating modes of the mechatronic system.

As a result, it is possible to analyze the eighth technical domain simply and efficiently and associate it with the other technical domains of the mechatronic system.

The operating mode can also be referred to as a mode of usage of the electronic system.

The operating modes are representative of information relating to a user of the mechatronic system, such as, for example, a driver profile in the case of a vehicle, and/or information indicating how the mechatronic system is used, such as, for example, whether the vehicle is operated primarily on short journeys or on a highway, or the like.

According to a further optional design, the multilayer network has an instruction layer. A respective node assigned to the instruction layer comprises one or more instruction attributes and is representative of a respective instruction for the fault clearance and/or analysis of the mechatronic system. The instruction layer is representative of associations between the respective instructions for the fault clearance and/or analysis of the mechatronic system. If the multilayer network has the component layer, a respective connection in each case between a node assigned to the instruction layer and a node assigned to the component layer is representative of the relevance of a respective mechatronic component represented by the corresponding node of the component layer for the fault clearance and/or analysis of the mechatronic system according to the respective instruction represented by the corresponding node of the instruction layer. If the multilayer network has the function layer, a respective connection in each case between a node assigned to the instruction layer and a node assigned to the function layer is representative of the relevance of the respective function represented by the corresponding node of the function layer for the fault clearance and/or analysis of the mechatronic system according to the respective instruction represented by the corresponding node of the instruction layer. If the multilayer network has the fault layer, a respective connection in each case between a node assigned to the instruction layer and a node assigned to the fault layer is representative of the relevance of the respective fault state represented by the corresponding node of the fault layer for the fault clearance and/or analysis of the mechatronic system according to the respective instruction represented by the corresponding node of the instruction layer. If the multilayer network has the diagnostic layer, a respective connection in each case between a node assigned to the instruction layer and a node assigned to the diagnostic layer is representative of the relevance of the respective diagnostic result represented by the corresponding node of the diagnostic layer for the fault clearance and/or analysis of the mechatronic system according to the respective instruction represented by the corresponding node of the instruction layer. If the multilayer network has the environment layer, a respective connection in each case between a node assigned to the instruction layer and a node assigned to the environment layer is representative of the relevance of a respective characteristic of the environment represented by the corresponding node of the environment layer for the fault clearance and/or the analysis of the mechatronic system according to the respective instruction represented by the corresponding node of the instruction layer.

The instruction layer is representative of a ninth technical domain of the mechatronic system, wherein the ninth technical domain comprises the respective instructions for the fault clearance and/or analysis of the mechatronic system and a representation of associations between the respective instructions for the fault clearance and/or analysis of the mechatronic system.

As a result, it is possible to analyze the ninth technical domain simply and efficiently and associate it with the other technical domains of the mechatronic system.

The instructions for the fault clearance and/or analysis of the mechatronic system comprise, for example, the test plans and/or results of the test plans.

The one or more instruction attributes comprise: the identification attribute and/or the type attribute which characterizes the respective node as an instruction for the fault clearance and/or analysis of the mechatronic system, and/or the name attribute or the like.

A second aspect is characterized by a structure for a network for analyzing a mechatronic system. The structure has a plurality of layers. A respective layer is representative in each case of a technical domain of the mechatronic system. The plurality of layers comprises one or more of the layers illustrated in connection with the method described above.

A third aspect is characterized by an apparatus for analyzing a mechatronic system. The apparatus is designed to carry out the method for analyzing a mechatronic system according to the first aspect.

A fourth aspect is characterized by a computer program, wherein the computer program comprises instructions which, when the computer program is executed by a computer, cause the computer to carry out the method for analyzing a mechatronic system according to the first aspect.

A fifth aspect is characterized by a computer-readable storage medium on which the computer program according to the fourth aspect is stored.

Optional designs of the first aspect can also be present accordingly in the further aspects and can have corresponding effects.

Example embodiments are explained in detail below with reference to the schematic drawings.

DETAILED DESCRIPTION

Elements having the same design or function are denoted with the same reference numbers in all figures.

Figure 1:
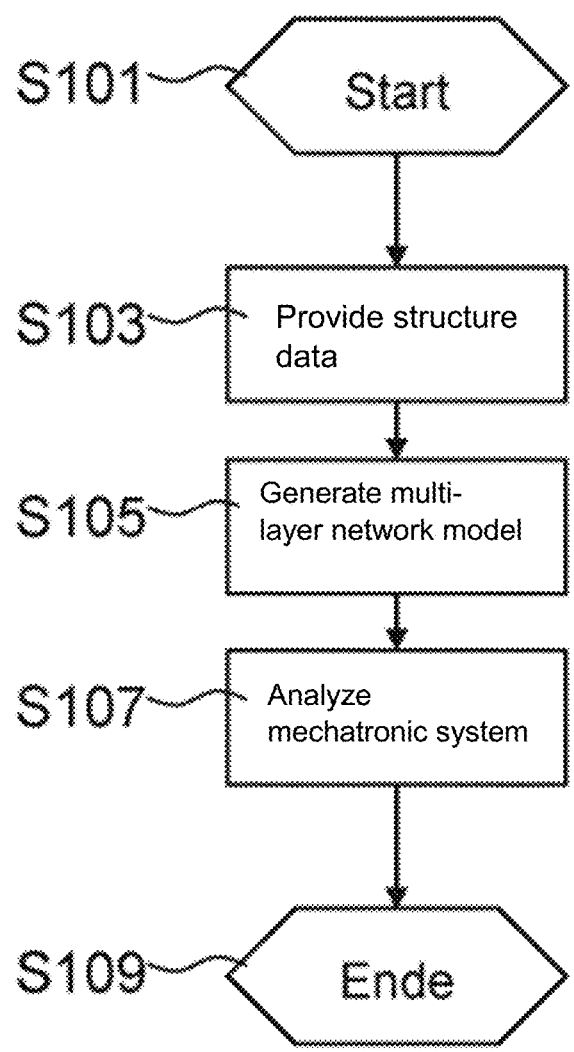
FIG. 1 shows a flow diagram of a program for analyzing a mechatronic system.

FIG. 1 shows a flow diagram of a program for analyzing a mechatronic system.

The program can be executed, in particular, by an apparatus. The apparatus has, in particular, a computing unit, a program memory and data memory for this purpose, and also, for example, one or more communication interfaces. The program memory and data memory and or the computing unit and/or the communication interfaces can be designed in one structural unit and/or can be distributed among a plurality of structural units.

The apparatus can also be referred to as an apparatus for analyzing a mechatronic system.

The program is stored, in particular, on the program memory and data memory of the apparatus for this purpose.

The program is started in a step S101 in which, if necessary, variables can be initialized.

In a step S103, structure data are provided. The structure data are representative of a predefined structure 10 for a network (cf. FIG. 2). The structure 10 has a plurality of layers 11, 12, 13, 14, 15, 16, 17, 18, 19, and a respective layer 10-19 is representative in each case of a technical domain of the mechatronic system.

In a step S105, a model in the form of a multilayer network 20 (cf. FIG. 3) is generated depending on a multiplicity of input data relating to the mechatronic system and to the predefined structure. The multilayer network 20 comprises a multiplicity of nodes 110, 120, 130, 140, 150, 160, 170, 180, 190 and a multiplicity of connections 300 in each case between two nodes 110-190. Each node 110-190 of the multiplicity of nodes is assigned to one of the plurality of layers 11-19.

Each connection of the multiplicity of connections 300 optionally comprises one or more of the following connection parameters: a first value which is designed to define whether the respective connection is a directional connection. If the respective connection is a directional connection, the connection parameters comprise a second value. The second value is designed to define a direction of the respective connection. The direction can preferably assume one of two unidirectional values and one bidirectional value. A third value is designed to define whether the respective connection is a weighted connection. If the respective connection is a weighted connection, the connection parameters comprise a fourth value. The fourth value is designed to define a weighting of the respective connection.

In a step S107, the mechatronic system is analyzed depending on the multilayer network.

Alternatively or additionally to step S107, the multilayer network 20 is stored in a graph structure for further processing, for example in a Neo4J format.

In a step S109, the program is ended and can be restarted if necessary in step S101.

Figure 2:
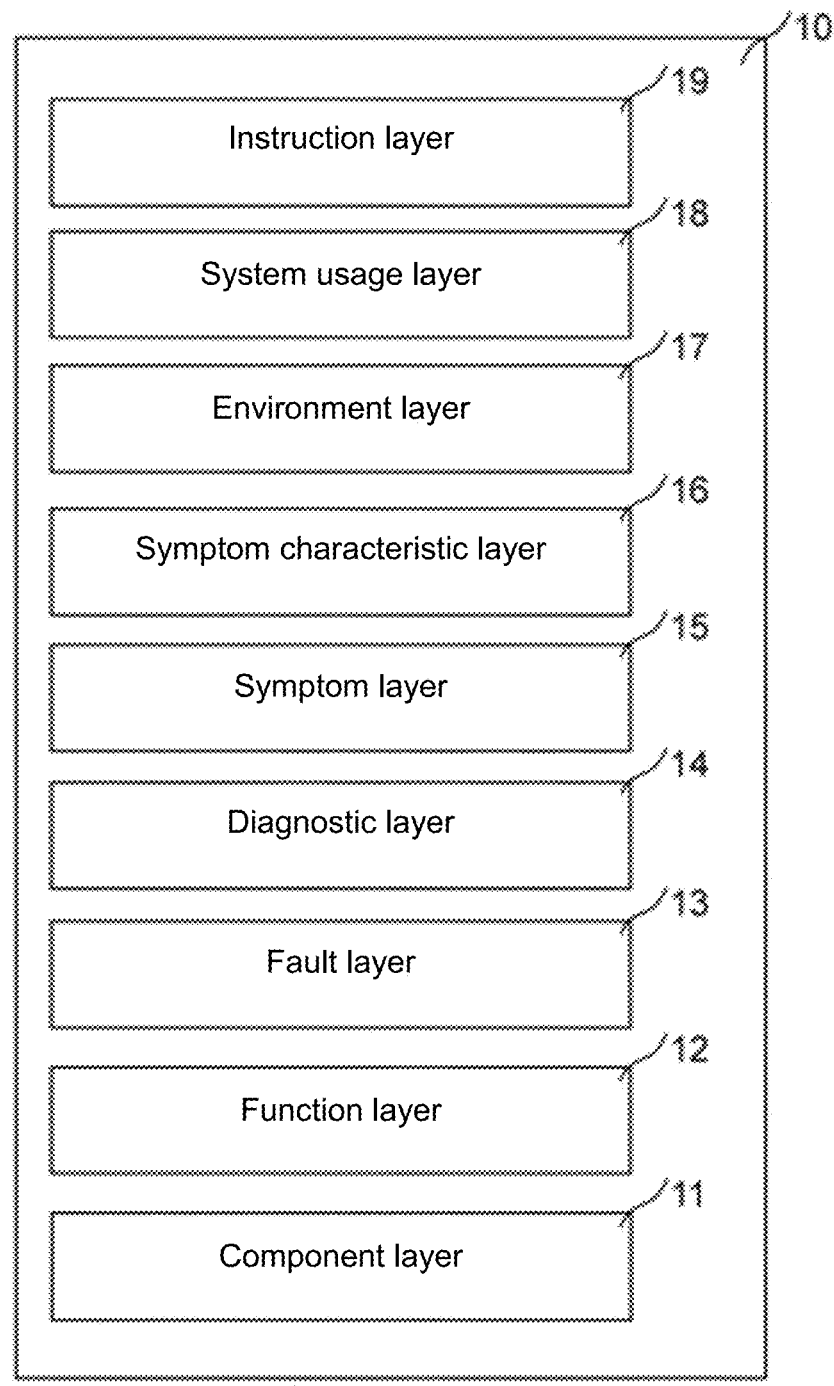
FIG. 2 shows an example of a visualization of a structure for a network for analyzing a mechatronic system.

FIG. 2 shows an example of a visualization of a structure 10 for a network for analyzing a mechatronic system. The mechatronic system has the same characteristics as the mechatronic system according to FIG. 1. The structure 10 has a plurality of layers 11-19. A respective layer 11-19 is representative in each case of a technical domain of the mechatronic system. The plurality of layers 11-19 comprise:
- a component layer 11 which is representative of a first technical domain of the mechatronic system, wherein the first technical domain comprises the one or more mechatronic components and their respective mechatronic mode of operation, and associations between the respective mechatronic components;
- a function layer 12 which is representative of a second technical domain of the mechatronic system, wherein the second technical domain comprises respective functions and a representation of functional processes between the respective functions of the mechatronic system;
- a fault layer 13 which is representative of a third technical of the mechatronic system, wherein the third technical domain comprises respective fault states of the respective functions in relation to the respective mechatronic components, and a representation of associations between the respective fault states of the functions in relation to the one or more mechatronic components;
- a diagnostic layer 14 which is representative of a fourth technical domain of the mechatronic system, wherein the fourth technical domain comprises respective diagnostic results of the mechatronic system and a representation of associations between the respective diagnostic results of the mechatronic system;
- a symptom layer 15 which is representative of a fifth technical domain of the mechatronic system, wherein the fifth technical domain comprises respective symptoms of the mechatronic system and a representation of associations between the respective symptoms of the mechatronic system;
- a system characteristic layer 16 which is representative of a sixth technical domain of the mechatronic system, wherein the sixth technical domain comprises respective symptom characteristics of the mechatronic system and a representation of associations between the respective system characteristics of the mechatronic system;
- an environment layer 17 which is representative of a seventh technical domain of the mechatronic system, wherein the seventh technical domain comprises respective characteristics of an environment in which the mechatronic system is operated and a representation of associations between the respective characteristics of the environment;
- a system usage layer 18 which is representative of an eighth technical domain of the mechatronic system, wherein the eighth technical domain comprises respective modes of operation of the mechatronic system and a representation of associations between the respective modes of operation of the mechatronic system;

an instruction layer 19 which is representative of a ninth technical domain of the mechatronic system, wherein the ninth technical domain comprises respective instructions for the fault clearance and/or analysis of the mechatronic system and a representation of associations between the respective instructions for the fault clearance and/or analysis of the mechatronic system.

Figure 3:
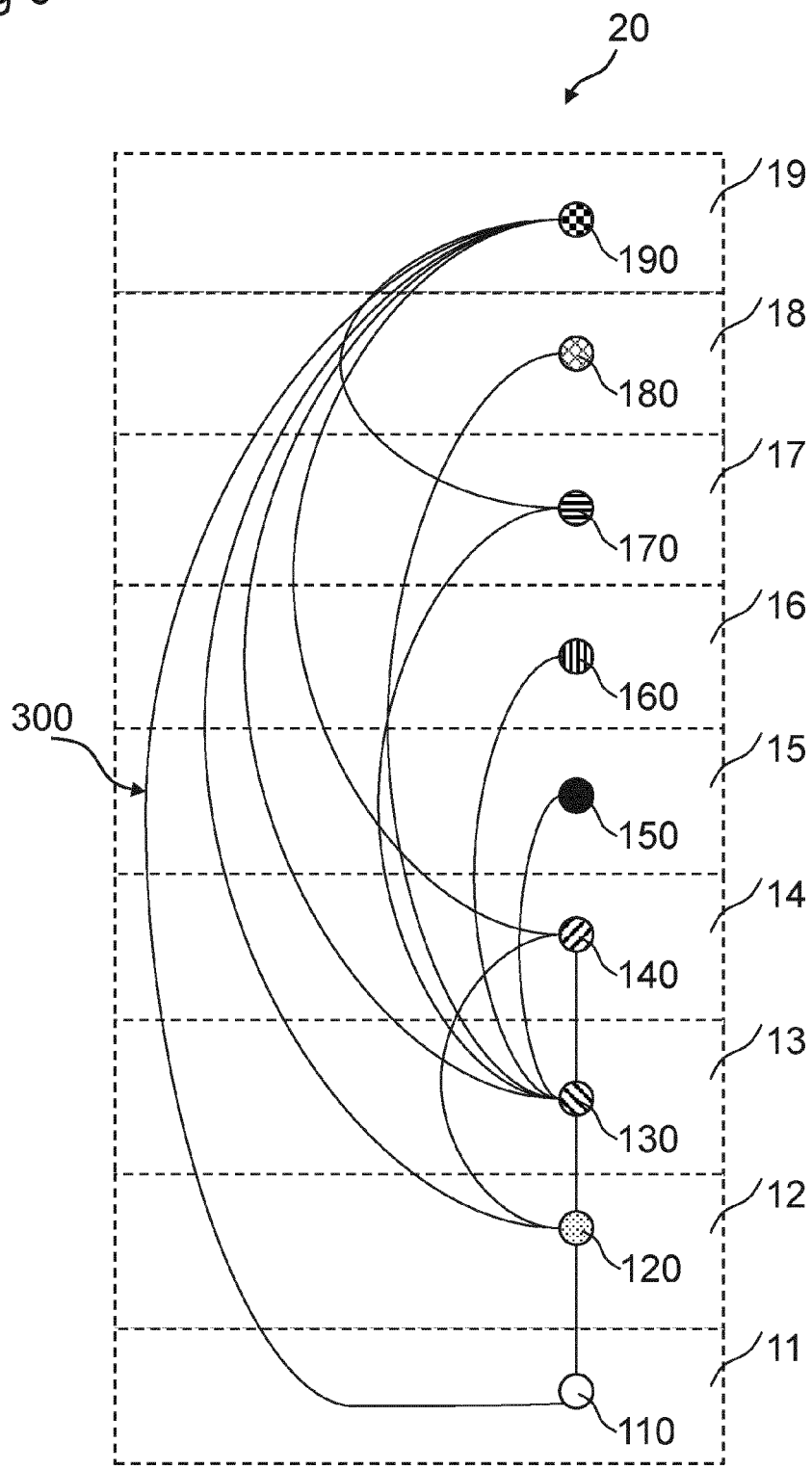
FIG. 3 shows a first example of a visualization of a multilayer network.

FIG. 3 shows a first example of a visualization of a multilayer network 20. The multilayer network 20 has the same layers 11-19 as the structure 10 according to FIG. 2. The multilayer network 20 comprises a multiplicity of nodes 110-190 and a multiplicity of connections 300 in each case between two nodes 110-190. Node 110 is assigned to layer 11. Node 120 is assigned to layer 12. Node 130 is assigned to layer 13. Node 140 is assigned to layer 14. Node 150 is assigned to layer 15. Node 160 is assigned to layer 16. Node 170 is assigned to layer 17. Node 180 is assigned to layer 18. Node 190 is assigned to layer 19. The multiplicity of connections 300 have the same characteristics as the multiplicity of connections according to FIG. 1. Contrary to the represented network 20, more than one node 110-190 can also be assigned to a single layer of the layers 11-19 (cf. examples of visualizations shown in FIG. 4, 5).

The connection between the node 120 assigned to the function layer 12 and the node 110 assigned to the component layer 11 is representative of the performance of a respective function represented by the corresponding node 120 of the function layer 12 by a respective mechatronic component represented by the corresponding node 110 of the component layer 11.

The connection between the node 130 assigned to the fault layer 13 and the node 120 assigned to the function layer is representative of the assignment of a respective fault state represented by the corresponding node 130 of the fault layer 13 to a respective function represented by the corresponding node 120 of the function layer 12.

The connection between the node 140 assigned to the diagnostic layer 14 and the node 130 assigned to the fault layer 13 is representative of the relevance of a respective diagnostic result represented by the corresponding node 140 of the diagnostic layer 14 for the recognition of the respective fault state represented by the corresponding node 130 of the fault layer 13.

The connection between the node 140 assigned to the diagnostic layer 14 and the node 120 assigned to the function layer 12 is representative of the relevance of a respective diagnostic result represented by the corresponding node 140 of the diagnostic layer 14 for the diagnosis of the respective function represented by the corresponding node 120 of the function layer 12.

The connection between the node 150 assigned to the symptom layer 15 and the node 130 assigned to the fault layer 13 is representative of the relevance of a respective symptom represented by the corresponding node 150 of the symptom layer 15 for recognizing the fault state represented by the corresponding node 130 of the fault layer 13.

The connection between the node 160 assigned to the system characteristic layer 16 and the node 130 assigned to the fault layer 13 is representative of the relevance of a respective system characteristic represented by the corresponding node 160 of the system characteristic layer 16 for recognizing the respective fault state represented by the corresponding node 130 of the fault layer 13.

The connection between the node 170 assigned to the environment layer 17 and the node 130 assigned to the fault layer 13 is representative of the relevance of a respective characteristic of the environment represented by the corresponding node 170 of the environment layer 17 for recognizing the respective fault state represented by the corresponding node 130 of the fault layer 13.

The connection between the node 180 assigned to the system usage layer 18 and the node 130 assigned to the fault layer 13 is representative of the relevance of a respective operating mode represented by the corresponding node 180 of the system usage layer 18 for recognizing the respective fault state represented by the corresponding node 130 of the fault layer 13.

The connection between the node 190 assigned to the instruction layer 19 and the node 110 assigned to the component layer 11 is representative of the relevance of a respective mechatronic component represented by the corresponding node 110 of the component layer 11 for the fault clearance and/or the analysis of the mechatronic system according to the respective instruction represented by the corresponding node 190 of the instruction layer 19.

The connection between the node 190 assigned to the instruction layer 19 and the node 120 assigned to the function layer 12 is representative of the relevance of a respective function represented by the corresponding node 120 of the function layer 12 for the fault clearance and/or the analysis of the mechatronic system according to the respective instruction represented by the corresponding node 190 of the instruction layer 19.

The connection between the node 190 assigned to the instruction layer 19 and the node 130 assigned to the fault layer 13 is representative of the relevance of the respective fault state represented by the corresponding node 130 of the fault layer 13 for the fault clearance and/or the analysis of the mechatronic system according to the respective instruction represented by the corresponding node 190 of the instruction layer 19.

The connection between the node 190 assigned to the instruction layer 19 and the node 140 assigned to the diagnostic layer 14 is representative of the relevance of the respective diagnostic result represented by the corresponding node 140 of the diagnostic layer 14 for the fault clearance and/or the analysis of the mechatronic system according to the respective instruction represented by the corresponding node 190 of the instruction layer 19.

A connection between the node 190 assigned to the instruction layer 19 and the node 170 assigned to the environment layer 17 is representative of the relevance of a respective characteristic of the environment represented by the corresponding node 170 of the environment layer 17 for the fault clearance and/or the analysis of the mechatronic system according to the respective instruction represented by the corresponding node 19 of the instruction layer 190.

Figure 4:
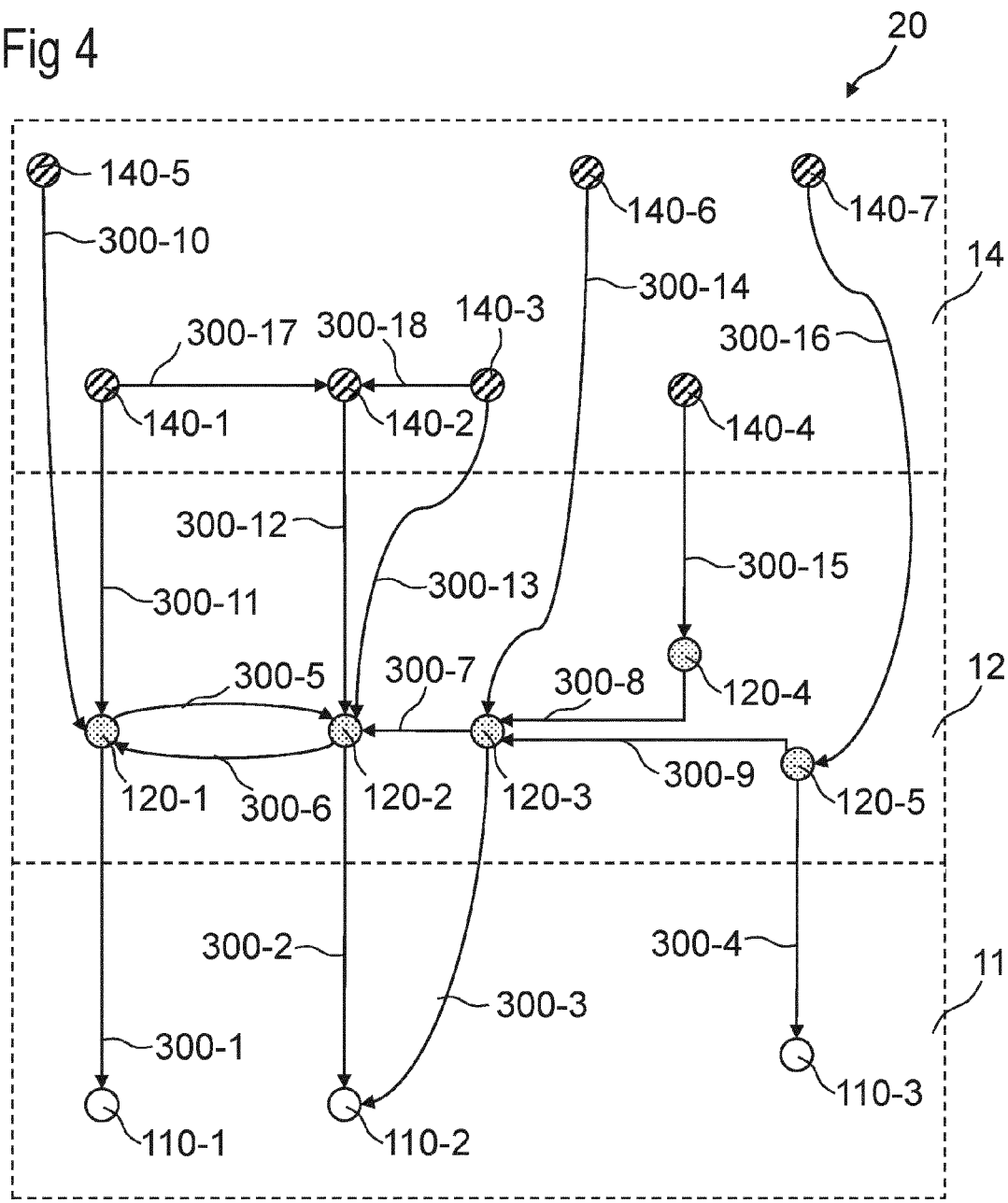
FIG. 4 shows a second example of a visualization of the multilayer network.

FIG. 4 shows a second example of a visualization of the multilayer network 20. The multilayer network 20 has the same characteristics as the multilayer network 20 according to FIG. 3. The second example of a visualization of the multilayer network 20 shows a first subset of the plurality of layers 11-19 of the multilayer network 20, wherein the first subset comprises the component layer 11, the function layer 12 and the diagnostic layer 14. According to the second example of a visualization, the multilayer network 20 comprises the following nodes and connections:

node 110-1 is assigned to the component layer 11 and is representative of a first mechatronic component and its mechatronic mode of operation. Node 110-2 is assigned to the component layer 11 and is representative of a second mechatronic component and its mechatronic mode of operation. Node 110-3 is assigned to the component layer 11 and is representative of a third mechatronic component and its mechatronic mode of operation. Nodes 110-1 to 110-3 assigned to the component layer 11 comprise one or more component attributes;

node 120-1 is assigned to the function layer 12 and is representative of a first function of the mechatronic system. Node 120-2 is assigned to the function layer 12 and is representative of a second function of the mechatronic system. Node 120-3 is assigned to the function layer 12 and is representative of a third function of the mechatronic system. Node 120-4 is assigned to the function layer 12 and is representative of a fourth function of the mechatronic system. Node 120-5 is assigned to the function layer 12 and is representative of a fifth function of the mechatronic system. Nodes 120-1 to 110-5 assigned to the function layer 12 comprise one or more function attributes;

node 140-1 is assigned to the diagnostic layer 14 and is representative of a first diagnostic result of the mechatronic system, wherein the first diagnostic result comprises a first DTC. Node 140-2 is assigned to the diagnostic layer 14 and is representative of a second diagnostic result of the mechatronic system, wherein the second diagnostic result comprises a second DTC. Node 140-3 is assigned to the diagnostic layer 14 and is representative of a third diagnostic result of the mechatronic system, wherein the third diagnostic result comprises a third DTC. Node 140-4 is assigned to the diagnostic layer 14 and is representative of a fourth diagnostic result of the mechatronic system, wherein the fourth diagnostic result comprises a fourth DTC. Node 140-5 is assigned to the diagnostic layer 14 and is representative of a fifth diagnostic result of the mechatronic system, wherein the fifth diagnostic result comprises a first HI. Node 140-6 is assigned to the diagnostic layer 14 and is representative of a sixth diagnostic result of the mechatronic system, wherein the sixth diagnostic result comprises a second HI. Node 140-7 is assigned to the diagnostic layer 14 and is representative of a seventh diagnostic result of the mechatronic system, wherein the seventh diagnostic result comprises a third HI;

connection 300-1 is representative of the performance of the first function by the first mechatronic component. Connection 300-2 is representative of the performance of the second function by the second mechatronic component. Connection 300-3 is representative of the performance of the third function by the second mechatronic component. Connection 300-4 is representative of the performance of the fifth function by the third mechatronic component;

connection 300-5 is representative of the first function of the first mechatronic component having a mechanical effect on the second function of the second mechatronic component. Connection 300-6 is representative of the second function of the second mechatronic component having a mechanical effect on the first function of the first mechatronic component. Connection 300-7 is representative of the third function of the second mechatronic component having a mechanical effect on the second function of the second mechatronic component. Connection 300-8 is representative of the fourth function of a fourth mechatronic component having an electrical effect on the third function of the second mechatronic component. Connection 300-9 is representative of the fifth function of the third mechatronic component having an electrical effect on the third function of the second mechatronic component;

connection 300-10 is representative of the assignment of the first HI to the first function. Connection 300-11 is representative of the assignment of the first DTC to the first function. Connection 300-12 is representative of the assignment of the second DTC to the second function. Connection 300-13 is representative of the assignment of the third DTC to the second function. Connection 314 is representative of the assignment of the second HI to the third function. Connection 300-15 is representative of the assignment of the fourth DTC to the fourth function. Connection 300-16 is representative of the assignment of the third HI to the fifth function. Connection 300-17 is representative of the connection of the first DTC to a first symptom and to the second DTC. Connection 300-18 is representative of the connection of the third DTC to a second symptom and to the second DTC.

Connections 300-1 to 300-18 have the same characteristics as the multiplicity of connections according to FIG. 1.

Figure 5:
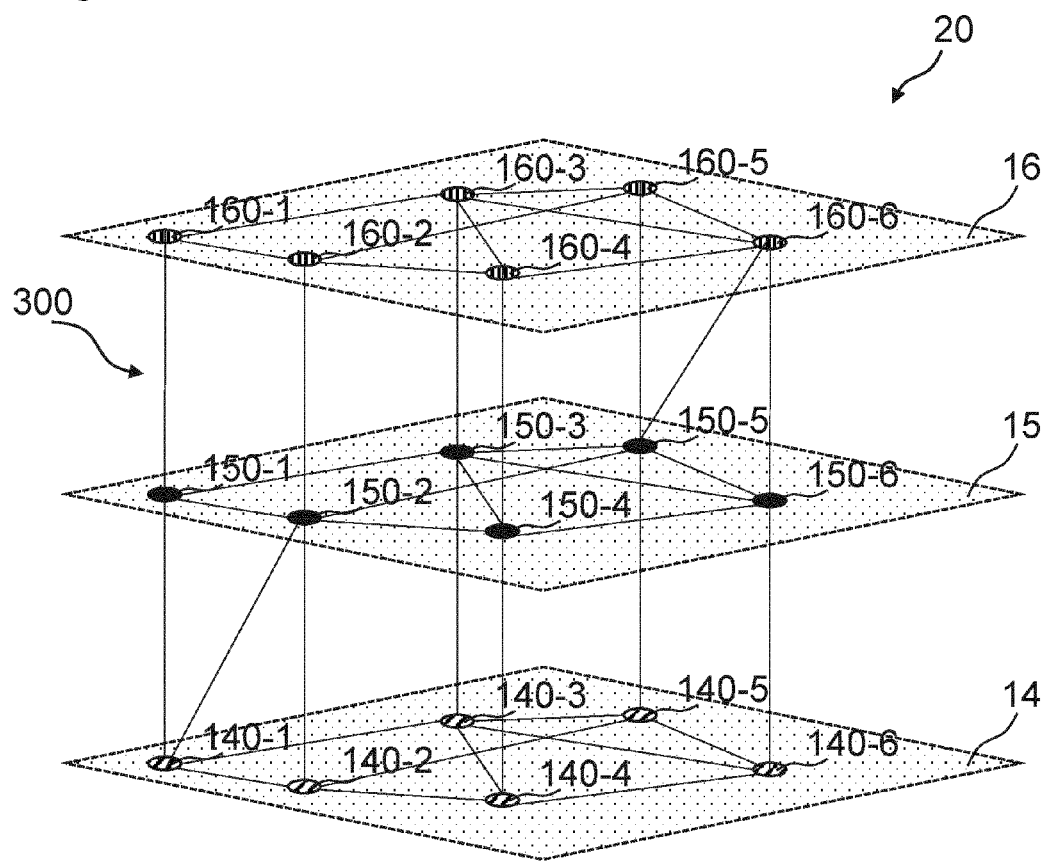
FIG. 5 shows a third example of a visualization of the multilayer network.

FIG. 5 shows a third example of a visualization of the multilayer network 20. The multilayer network 20 has the same characteristics as the multilayer network 20 according to FIG. 3. The third example of a visualization of the multilayer network 20 shows a second subset of the plurality of layers 11-19 of the multilayer network 20, wherein the second subset comprises the diagnostic layer 14, the symptom layer 15 and the system characteristic layer 16. According to the third example of a visualization, the multilayer network 20 comprises nodes 140-1, 140-2, 140-3, 140-4, 140-5, 140-6, 150-1, 150-2, 150-3, 150-4, 150-5, 150-6, 160-1, 160-2, 160-3, 160-4, 160-5 and 160-6, and a multiplicity of connections 300. The multiplicity of connections 300 have the same characteristics as the multiplicity of connections according to FIG. 1. Nodes 140-1 to 140-6 are assigned to the diagnostic layer 14. Nodes 150-1 to 150-6 are assigned to the symptom layer. Nodes 160-0 to 160-6 are assigned to the system characteristic layer.

A plurality of nodes and connections of the multilayer network 20 can be combined with specific values to form a fault pattern.

For the sake of clarity, the multilayer network 20 shown according to FIGS. 3 to 5 is in each case a highly simplified illustration of a multilayer network for analyzing a mechatronic system. In practice, the multilayer network 20 can comprise several thousand nodes (e.g. fault states, symptoms, etc.) and several thousand connections (e.g. weighted connection or connection provided with a sensitivity, for example of a respective symptom to a respective fault state). The representation of the multilayer network 20 is restricted, by way of example, to selected nodes and connections in order to clearly illustrate the associations and mechanisms. It is also possible for the structure for the network for analyzing the mechatronic system and/or the multilayer network 20 to have more or fewer layers than in the respective examples.

The invention claimed is:

1. A method for analyzing and clearing a fault in a vehicle which has one or more mechatronic components, the method comprising:

providing structure data representative of a predefined structure for a network, wherein the predefined structure has a plurality of layers and each respective layer of the plurality of layers is representative in each case of a technical domain of the vehicle;

generating, with a computer, a model in the form of a multilayer network depending on a multiplicity of input data relating to the vehicle and to the predefined structure, wherein the multilayer network comprises a plurality of nodes and a plurality of connections, each of the plurality of connections being between two nodes, wherein each node of the plurality of nodes is assigned to one of the plurality of layers, the multilayer network including an instruction layer wherein each respective node assigned to the instruction layer comprises one or more instruction attributes and is representative of a respective instruction for a fault clearance and analysis of the vehicle, the instruction layer representative of associations between the respective instructions for the fault clearance and analysis of the vehicle;

analyzing, with the computer, the vehicle depending on the multilayer network; and performing the instruction for the fault clearance on the vehicle in order to clear a fault in the vehicle.

2. The method as claimed in claim 1, wherein each connection of the plurality of connections comprises one or more connection parameters comprising one or more of:
- a first value configured to define whether the respective connection is a directional connection;
- if the respective connection is a directional connection, a second value configured to define a direction of the respective connection, wherein the direction can preferably assume one of two unidirectional values and one bidirectional value;
- a third value configured to define whether the respective connection is a weighted connection, and
- if the respective connection is a weighted connection, a fourth value configured to define a weighting of the respective connection.

3. The method as claimed in claim 1, wherein the multilayer network has a component layer, and wherein:
- a respective node assigned to the component layer comprises one or more component attributes and is representative of a respective mechatronic component and its mechatronic mode of operation; and
- the component layer is representative of associations between the respective mechatronic components.

4. The method as claimed in claim 3, wherein the multilayer network has a function layer, and wherein:
- a respective node assigned to the function layer comprises one or more function attributes and is representative of a respective function of the vehicle;
- the function layer is representative of functional processes between respective functions; and
- a respective connection in each case between a node assigned to the function layer and a node assigned to the component layer is representative of a performance of the respective function represented by the corresponding node of the function layer by a respective mechatronic component represented by the corresponding node of the component layer.

5. The method as claimed in claim 1, wherein the multilayer network has a fault layer, and wherein:
- a respective node assigned to the fault layer comprises one or more fault attributes and is representative of a respective fault state of a respective function in relation to a respective mechatronic component;
- the fault layer is representative of associations between respective fault states; and
- if the multilayer network has a function layer, a respective connection in each case between a node assigned to the fault layer and a node assigned to the function layer is representative of the assignment of a respective fault state represented by the corresponding node of the fault layer to a respective function represented by the corresponding node of the function layer.

6. The method as claimed in claim 5, wherein the multilayer network has a diagnostic layer, and wherein:
- a respective node assigned to the diagnostic layer comprises one or more diagnostic attributes and is representative of a respective diagnostic result of the vehicle;
- the diagnostic layer is representative of associations between the respective diagnostic results; and
- a respective connection in each case between a node assigned to the diagnostic layer and a node assigned to the fault layer is representative of a relevance of a respective diagnostic result represented by the corresponding node of the diagnostic layer for recognizing a respective fault state represented by the corresponding node of the fault layer.

7. The method as claimed in claim 5, wherein the multilayer network has a symptom layer, and wherein:
- a respective node assigned to the symptom layer comprises one or more symptom attributes and is representative of a respective symptom of the vehicle;
- the symptom layer is representative of associations between the respective symptoms; and
- a respective connection in each case between a node assigned to the symptom layer and a node assigned to the fault layer is representative of a relevance of a respective symptom represented by the corresponding node of the symptom layer for recognizing a respective fault state represented by the corresponding node of the fault layer.

8. The method as claimed in claim 5, wherein the multilayer network has a system characteristic layer, and wherein:
- a respective node assigned to the system characteristic layer comprises one or more system characteristic attributes and is representative of a respective system characteristic of the vehicle;
- the system characteristic layer is representative of associations between the respective system characteristics; and
- a respective connection in each case between a node assigned to the system characteristic layer and a node assigned to the fault layer is representative of the relevance of a respective system characteristic represented by the corresponding node of the system characteristic layer for recognizing a respective fault state represented by the corresponding node of the fault layer.

9. The method as claimed in claim 5, wherein the multilayer network has an environment layer, and wherein:
- a respective node assigned to the environment layer comprises one or more environment attributes and is representative of a respective characteristic of an environment in which the vehicle is operated;
- the environment layer is representative of associations between the respective characteristics of the environment; and
- a respective connection in each case between a node assigned to the environment layer and a node assigned to the fault layer is representative of the relevance of a respective characteristic of the environment represented by the corresponding node of the environment layer for recognizing a respective fault state represented by the corresponding node of the fault layer.

10. The method as claimed in claim 1, wherein the multilayer network has a system usage layer, and wherein:
- a respective node assigned to the system usage layer comprises one or more system usage attributes and is representative of a respective mode of operation of the vehicle;
- the system usage layer is representative of associations between the respective modes of operation of the vehicle; and
- if the multilayer network has a fault layer, a respective connection in each case between a node assigned to the system usage layer and a node assigned to the fault layer is representative of the relevance of a respective operating mode represented by the corresponding node of the system usage layer for recognizing a respective fault state represented by the corresponding node of the fault layer.

11. The method as claimed in claim 1, wherein:
- the multilayer network has a component layer, wherein a respective connection in each case between a node assigned to the instruction layer and a node assigned to the component layer is representative of the relevance of a respective mechatronic component represented by the corresponding node of the component layer for the fault clearance and/or analysis of the vehicle according to the respective instruction represented by the corresponding node of the instruction layer;
- the multilayer network has a function layer, wherein a respective connection in each case between a node assigned to the instruction layer and a node assigned to the function layer is representative of a relevance of a respective function represented by a corresponding node of the function layer for the fault clearance and/or analysis of the vehicle according to the respective instruction represented by the corresponding node of the instruction layer;
- the multilayer network has a fault layer, wherein a respective connection in each case between the node assigned to the instruction layer and a node assigned to the fault layer is representative of a relevance of a respective fault state represented by the corresponding node of the fault layer for the fault clearance and/or analysis of the vehicle according to the respective instruction represented by the corresponding node of the instruction layer;
- the multilayer network has a diagnostic layer, wherein a respective connection in each case between the node assigned to the instruction layer and a node assigned to the diagnostic layer is representative of the relevance of a respective diagnostic result represented by the corresponding node of the diagnostic layer for the fault clearance and/or analysis of the vehicle according to the respective instruction represented by the corresponding node of the instruction layer; and
- the multilayer network has an environment layer, a respective connection in each case between the node assigned to the instruction layer and a node assigned to the environment layer is representative of a relevance of a respective characteristic of the environment represented by the corresponding node of the environment layer for the fault clearance and/or the analysis of the vehicle according to the respective instruction represented by the corresponding node of the instruction layer.

12. An apparatus which is designed to carry out the method as claimed in claim 1.

13. A non-transitory computer program, wherein the computer program comprises instructions which, when the program is executed by a computer, cause the computer to carry out the method as claimed in claim 1.

14. A non-transitory computer-readable storage medium on which the computer program as claimed in claim 13 is stored.

15. The method as claimed in claim 1, wherein the multilayer network has a function layer, and wherein:
- a respective node assigned to the function layer comprises one or more function attributes and is representative of a respective function of the vehicle;
- the function layer is representative of functional processes between respective functions; and
- if the multilayer network has a component layer, a respective connection in each case between a node assigned to the function layer and a node assigned to the component layer is representative of a performance of the respective function represented by the corresponding node of the function layer by a respective mechatronic component represented by the corresponding node of the component layer.

16. The method as claimed in claim 1, wherein the multilayer network has a diagnostic layer, and wherein:
- a respective node assigned to the diagnostic layer comprises one or more diagnostic attributes and is representative of a respective diagnostic result of the vehicle;
- the diagnostic layer is representative of associations between the respective diagnostic results; and
- if the multilayer network has a fault layer, a respective connection in each case between a node assigned to the diagnostic layer and a node assigned to the fault layer is representative of a relevance of a respective diagnostic result represented by the corresponding node of the diagnostic layer for recognizing a respective fault state represented by the corresponding node of the fault layer.

17. The method as claimed in claim 1, wherein the multilayer network has a symptom layer, and wherein:
- a respective node assigned to the symptom layer comprises one or more symptom attributes and is representative of a respective symptom of the vehicle;
- the symptom layer is representative of associations between the respective symptoms; and
- if the multilayer network has a fault layer, a respective connection in each case between a node assigned to the symptom layer and a node assigned to the fault layer is representative of a relevance of a respective symptom represented by the corresponding node of the symptom layer for recognizing a respective fault state represented by the corresponding node of the fault layer.

18. The method as claimed in claim 1, wherein the multilayer network has a system characteristic layer, and wherein:
- a respective node assigned to the system characteristic layer comprises one or more system characteristic attributes and is representative of a respective system characteristic of the vehicle;
- the system characteristic layer is representative of associations between the respective system characteristics; and
- if the multilayer network has a fault layer, a respective connection in each case between a node assigned to the system characteristic layer and a node assigned to the fault layer is representative of the relevance of a respective system characteristic represented by the corresponding node of the system characteristic layer for recognizing a respective fault state represented by the corresponding node of the fault layer.

19. The method as claimed in claim 1, wherein the multilayer network has an environment layer, and wherein:
   a respective node assigned to the environment layer comprises one or more environment attributes and is representative of a respective characteristic of an environment in which the vehicle is operated;
   the environment layer is representative of associations between the respective characteristics of the environment; and
   if the multilayer network has a fault layer, a respective connection in each case between a node assigned to the environment layer and a node assigned to the fault layer is representative of the relevance of a respective characteristic of the environment represented by the corresponding node of the environment layer for recognizing a respective fault state represented by the corresponding node of the fault layer.

20. The method of claim 1 wherein performing the instruction for the fault clearance on the vehicle results in a fault clearance in the vehicle.

* * * * *